UNITED STATES PATENT OFFICE.

CHARLES BASKERVILLE, OF NEW YORK, N. Y.

PROCESS OF BLEACHING COTTON-SEED OIL.

1,105,743.
Specification of Letters Patent. Patented Aug. 4, 1914.
No Drawing.
Application filed January 24, 1913. Serial No. 744,045.

*To all whom it may concern:*

Be it known that I, CHARLES BASKERVILLE, a citizen of the United States, residing at New York, in the county of New York and State of New York, have invented certain new and useful Improvements in Processes of Bleaching Cotton-Seed Oil, of which the following is a specification.

For the purpose of bleaching cottonseed oil, it is a common practice to treat the oil with an absorbent inorganic decolorizing agent, such as fullers' earth, and then filter. I have discovered that a mixture of fullers' earth and electrolytes is a more effective bleaching agent than the earth alone. Electrolytes which, for example, have been used and found desirable, are the chlorids and sulfates of sodium, potassium and iron, calcium chlorid and aluminum-potassium sulfate, sodium chlorid being preferred for bromatological and economic reasons. Halid acids may be used but are regarded as less desirable. The action of the electrolytes used in the process is based on the fact, also discovered by me, that cottonseed oil contains a colloidal coloring-matter, similar in many respects to a dissolved dyestuff. The electrolyte, dissolved in the small amount of water present in the oil and fullers' earth, coagulates, agglomerates or pectizes this colloidal coloring-matter, the aggregated particles being of such comparatively large size that they may be easily removed by the fullers' earth, by absorption and entanglement. In carrying out the present process, based on this discovery, I preferably agitate the cottonseed oil with a mixture of ten parts by weight of fullers' earth and one part by weight of sodium chlorid, the total amount of the mixture employed being, for example, eleven per cent. by weight of the oil treated. The treatment is preferably carried out at a temperature of about 70° C., being continued for a period of, say, one hour, with agitation to keep the mixture in suspension. The product is then treated in the usual manner, except that it is washed sufficiently to remove any sodium chlorid dissolved in the oil. The product so treated is superior to that obtained by using fullers' earth alone, even in successive portions which may sum up to twenty per cent. by weight of the oil, being more brilliant and lighter in color. If necessary, however, instead of one treatment, successive treatments with the absorbent, as fullers' earth, and the electrolyte, may be employed.

It has been ascertained that, in practice, approximately three per cent. of fullers' earth will accomplish on an industrial scale what ten per cent. of fullers' earth will accomplish on a laboratory scale. I do not, therefore, restrict myself to ten per cent. of fullers' earth and one per cent. of sodium chlorid.

I claim:

1. The herein-described process of bleaching vegetable oils containing a colloidal coloring-matter, which consists in treating the oil with an inorganic absorbent having the essential qualities of fullers' earth, in presence of an electrolyte, under conditions to coagulate said colloidal coloring-matter.

2. The herein-described process of bleaching vegetable oils containing a colloidal coloring-matter, which consists in agitating the oil at a temperature below 100° C. with an inorganic absorbent having the essential qualities of fullers' earth, in presence of an electrolyte, under conditions to coagulate said colloidal coloring-matter.

In testimony whereof I affix my signature in presence of two witnesses.

CHARLES BASKERVILLE.

Witnesses:
W. A. HAMOR,
THOMAS F. O'KEEFFE.